United States Patent [19]

Suganuma

[11] Patent Number: 4,677,551

[45] Date of Patent: Jun. 30, 1987

[54] APPARATUS FOR PRODUCING A SERIES OF DOCUMENTS FROM REFORMATTED INPUT DATA AND FOR CHECKING THE ORDER OF PRODUCTION

[75] Inventor: Saburo Suganuma, Kanagawa, Japan

[73] Assignee: Fuji Xerox Co., Ltd., Tokyo, Japan

[21] Appl. No.: 568,913

[22] Filed: Jan. 6, 1984

[30] Foreign Application Priority Data

Jan. 14, 1983 [JP] Japan .................................. 58-3426

[51] Int. Cl.[4] ........................ G06F 15/22; G06K 9/00

[52] U.S. Cl. ..................................... 364/401; 101/72; 283/60 R; 382/57; 382/61

[58] Field of Search ............... 364/401, 419, 406, 715, 364/200 MS File, 900 MS File; 235/432, 433, 470, 437; 382/57, 59, 61; 101/DIG. 2, 92, 72, 76, 77; 283/60 R, 66 R

[56] References Cited

U.S. PATENT DOCUMENTS

| | | | |
|---|---|---|---|
| 3,035,764 | 5/1962 | Beman | 235/432 X |
| 3,335,407 | 8/1967 | Lange et al. | 235/432 X |
| 3,805,249 | 4/1974 | Rich | 364/200 |
| 3,872,433 | 3/1975 | Holmes et al. | 382/61 |
| 4,016,549 | 4/1977 | Hutner | 364/900 |
| 4,028,680 | 6/1977 | Vittorelli | 400/17 X |
| 4,045,780 | 8/1977 | Kashio | 364/900 |
| 4,114,030 | 9/1978 | Nojiri et al. | 235/470 X |
| 4,205,780 | 6/1980 | Burns et al. | 235/432 X |
| 4,300,123 | 11/1981 | McMillin et al. | 235/456 X |
| 4,309,101 | 1/1982 | Nakamura et al. | 355/14 R |
| 4,379,631 | 4/1983 | Kitamura | 355/14 R |
| 4,397,542 | 8/1983 | Brodesser | 355/14 R |
| 4,403,301 | 9/1983 | Fessel | 364/900 |
| 4,405,225 | 9/1983 | Perrault | 355/14 R |
| 4,459,678 | 7/1984 | McCaskill et al. | 364/900 |
| 4,481,603 | 11/1984 | McCaskill et al. | 364/900 |
| 4,485,299 | 11/1984 | Imamoto et al. | 235/432 |
| 4,505,576 | 3/1985 | Sugiura et al. | 355/14 R |
| 4,542,378 | 9/1985 | Suganuma et al. | 382/61 X |
| 4,553,261 | 11/1985 | Froessl | 382/57 |
| 4,566,127 | 1/1986 | Sekiya et al. | 340/734 |
| 4,604,696 | 8/1986 | Suganuma et al. | 364/401 |
| 4,633,395 | 12/1986 | Kuehfuss | 101/72 |

FOREIGN PATENT DOCUMENTS 0125877 11/1984 European Pat. Off. .

OTHER PUBLICATIONS

Aden, S. G. "Document Format Selection and Control Process", *IBM Tech. Discl. Bulletin,* vol. 26, No. 9, Feb. 1984, 4718-9.

*Primary Examiner*—Jerry Smith
*Assistant Examiner*—Clark A. Jablon
*Attorney, Agent, or Firm*—Finnegan, Henderson, Farabow, Garrett and Dunner

[57] ABSTRACT

A document issuing apparatus wherein images of different forms and images of data to be printed on the forms are produced and stored in a memory. The form images and data images are combined and edited to produce a series of slip images. A printing device prints the slip images on a sequence of documents. The sequence of documents is examined by a checking device to determine if the documents have been printed in the proper order.

5 Claims 3 Drawing Figures

(PRIOR ART)

APPARATUS FOR PRODUCING A SERIES OF DOCUMENTS FROM REFORMATTED INPUT DATA AND FOR CHECKING THE ORDER OF PRODUCTION

FIELD OF THE INVENTION

This invention relates to a slip or document issuing apparatus in which the data to be entered on the slips or documents are read and stored, the relevant data are edited electronically, and slips or documents with the proper form and information are printed out.

BACKGROUND OF THE INVENTION

In the processing of delivery slips for gift sales in a department store, a written order for a gift is prepared when a customer has requested the department store to deliver a gift to another person. The written order is used for producing a delivery slip. The delivery slip is used during the period that the ordered item or gift is selected, wrapped, and delivered to a delivery station together with a delivery memorandum. The gift is delivered to the destination from the delivery station and receipt of the gift is acknowledged by a signature. The signed receipt is returned to the store to complete billing and record keeping procedures.

Different department stores employ different types of delivery slips, but in general, each set of delivery slips commonly includes the following individual slips:

(1) A work slip which is used in a delivery department where items ordered for delivery are taken, wrapped for delivery and the work slip also serving to clear accounts;

(2) A slip corresponding to a tag attached to the ordered item to be delivered;

(3) A duplicate slip used in the delivery station for dispatch; and (4) A slip used as a receipt and upon which the signature of the recipient is written to certify the delivery of the ordered item to the destination.

Information in the written order for the gifts, such as the name and address of the customer, the name and address of each person to receive an ordered item or gift, and the number of ordered items or gifts, are entered, as common data, on each individual slip. The slips relating to the same order are then forwarded, as one set of slips, to the delivery, gift, or similar department responsible for fulfilling the customer's request. It is essential that the individual slips in a set be arranged in the proper order so that they can be removed as various steps in the delivery process are completed.

Heretofore, the above-described slips have been prepared according to (1) a spirit system, (2) a copy system (or an overlay system), and (3) a hand written system. According to these systems, a set of delivery slips is prepared by transferring or copying necessary data on preprinted sheets from the written order.

However, since a busy department store prepares a large number of different delivery slips to fulfill many gift orders, the slips often become mixed up and out of order or are incorrectly issued in duplicate. Accordingly, much time and labor must be devoted to checking the delivery slips causing the conventional procedure to be uneconomical and inefficient.

OBJECTS AND SUMMARY OF THE INVENTION

Accordingly, an object of the present invention is a document issuing apparatus in which the above-described drawbacks accompanying the conventional procedure of preparing documents have been eliminated;

Another object of the present invention is a document issuing apparatus for preparing a number of sets of documents arranged in order and issued correctly at all times to make it unnecessary to check the issued documents.

A further object of the present invention is a document issuing apparatus wherein form information and order information for a set of delivery slips are electronically stored and edited and are simultaneously reproduced on blank slips.

Still another object of the present invention is document issuing apparatus which verifies that a set of delivery slips are printed and assembled with the slips in a proper sequence.

Yet another object of the present invention is a document issuing apparatus wherein the unintentional printing of duplicate sets of order slips is prevented.

These and other objects are accomplished by a document issuing apparatus comprising means for reading image data and form data from documents, memory means for storing the image data and form data read by the reading means, means for combining and editing the image data and form data stored in said memory means to produce a series of slip images, means for printing the slip images on respective documents, and means for examining the documents printed with the slip images to verify the order in which the documents have been printed.

BRIEF DESCRIPTION OF THE DRAWINGS

These and other objects, features, and advantages of the present invention, as well as the invention itself, will become more apparent to those skilled in the act when considered in the light of the accompanying drawings, wherein.

DETAILED DESCRIPTION OF THE PREFERRED EMBODIMENT

Figure 1A:
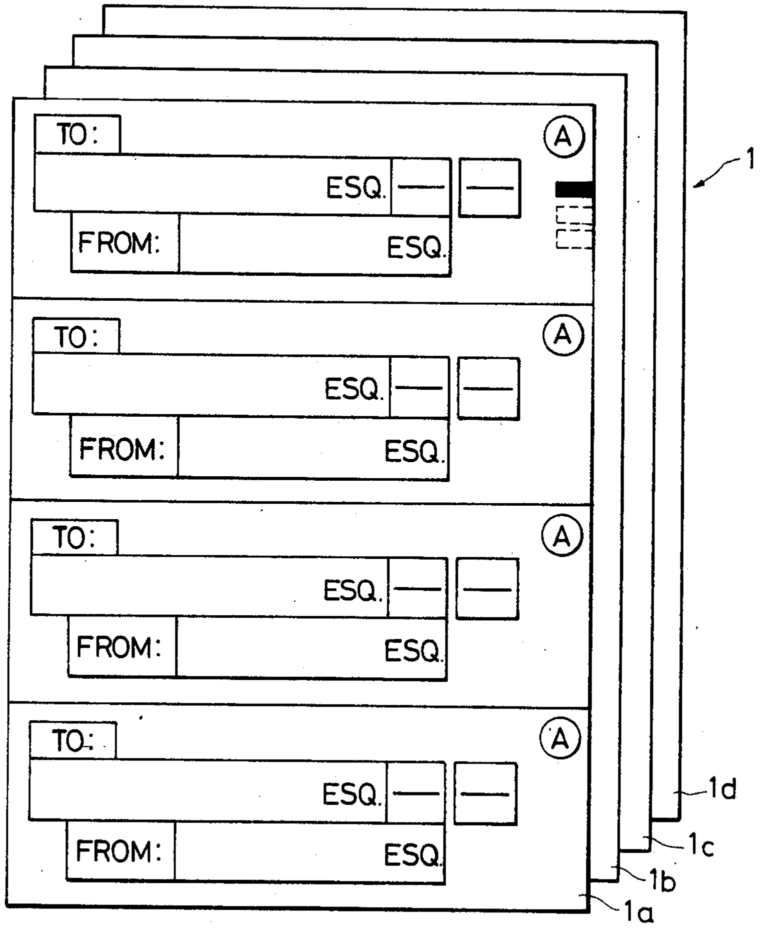
FIGS. 1(*a*) and 1(*b*) are examples of a blank form with identifying indicia and an order form, respectively.
Figure 1B:
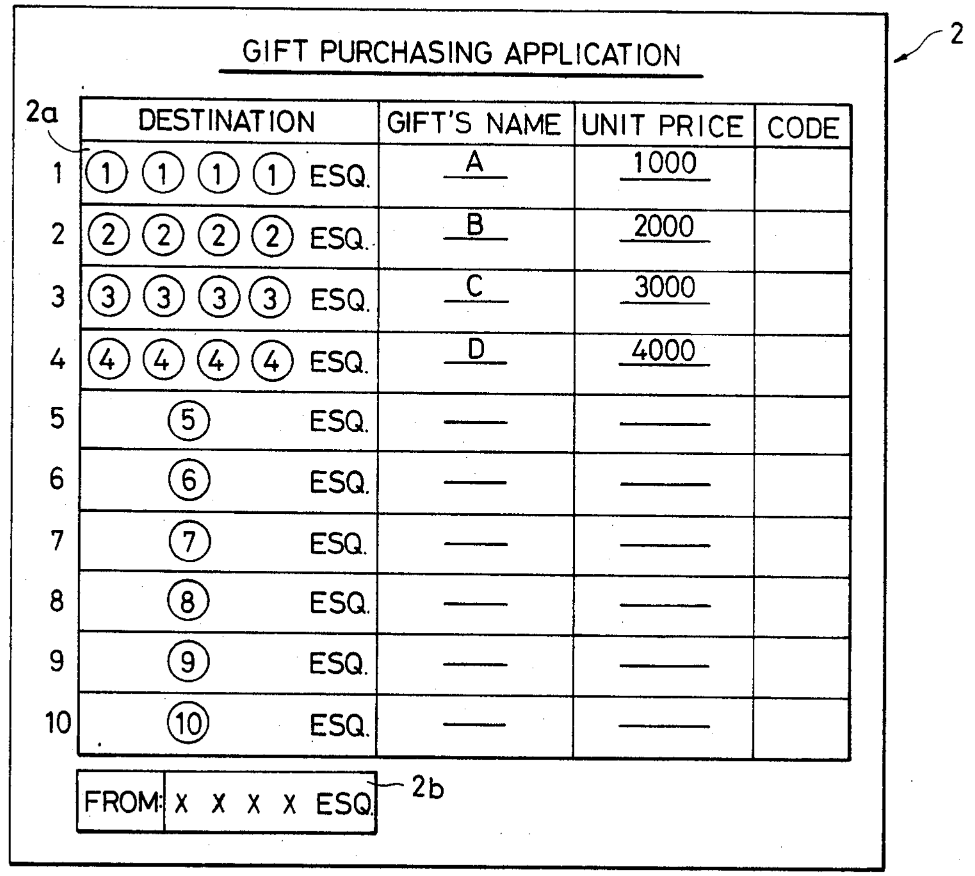
Figure 2A:
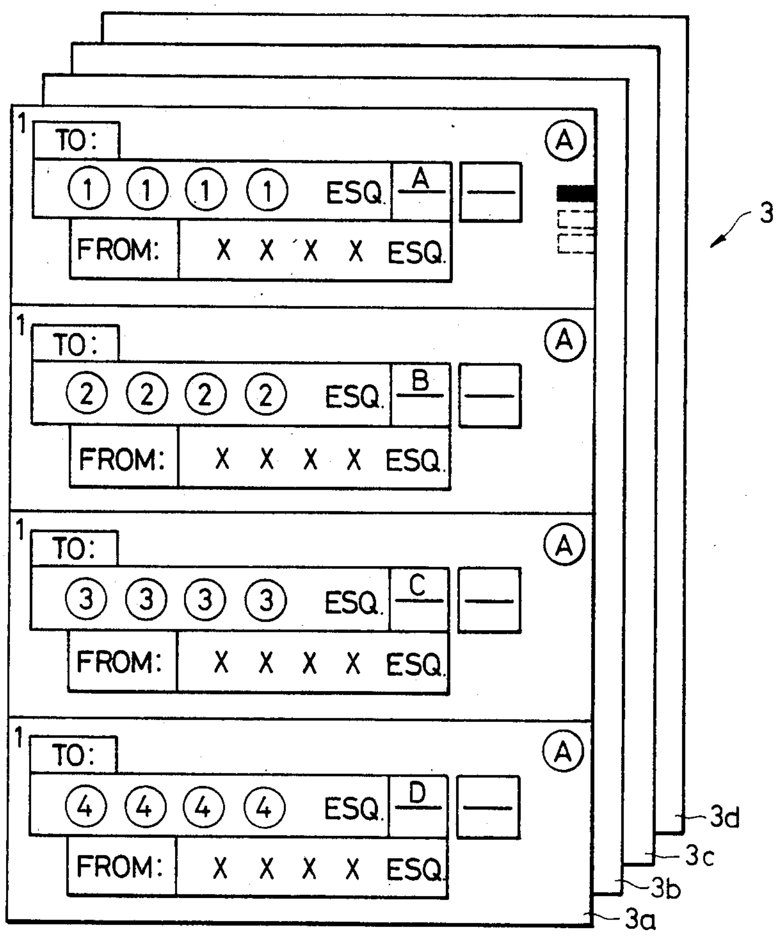
FIGS. 2(*a*) through 2(*d*) are examples of delivery slips.
Figure 2B:
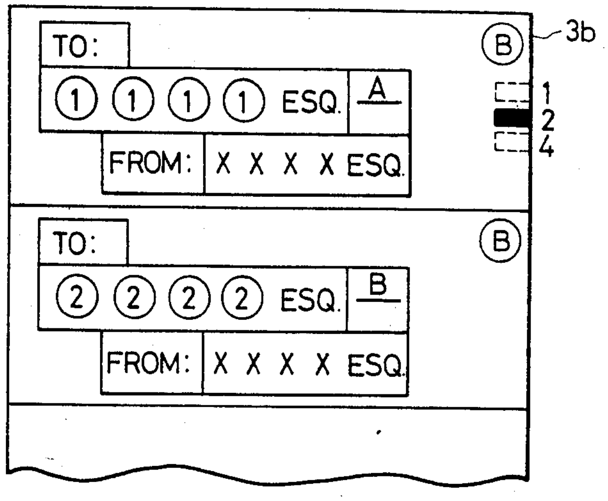
Figure 2C:
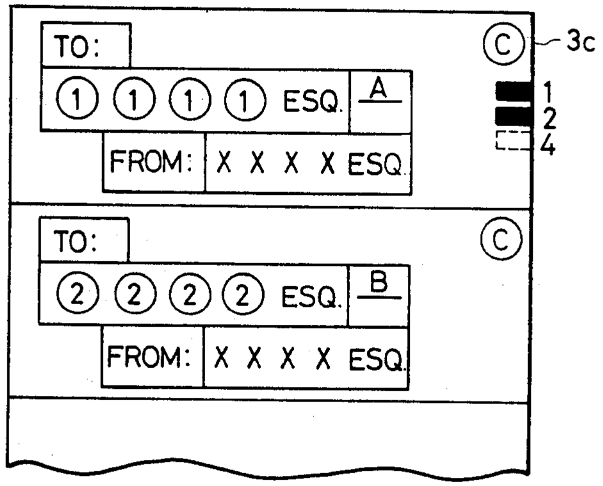
Figure 2D:
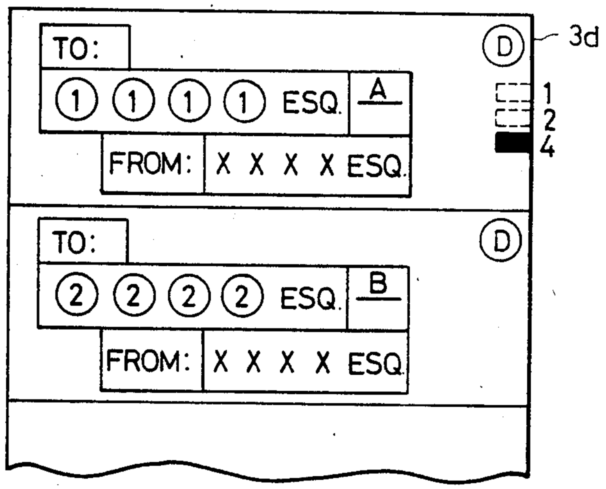

FIG. 1(*a*) shows one example of one set of delivery slip blank forms which is used in department stores or the like, as was described above. FIG. 1(*b*) shows one example of a gift purchasing application on which data have been entered according to a gift order. Elements 1*a*–1*d* of FIG. 1(*a*), comprise four documents or the slips which form a set of written delivery slips.

As is apparent from FIG. 1(*a*) and FIGS. 2(*a*)–2(*d*), digital marks representing form numbers or slip numbers are printed on the upper right corners of the delivery slip blank forms 1 of the delivery slips 3 which have been provided according to a gift purchasing application form 2. For instance, marks representing numerals "1", "2", "3", and "4" are printed on the top of the first slip 3*a*, the second slip 3*b*, the third slip 3*c*, and the fourth slip 3*d*, respectively.

Figure 3:
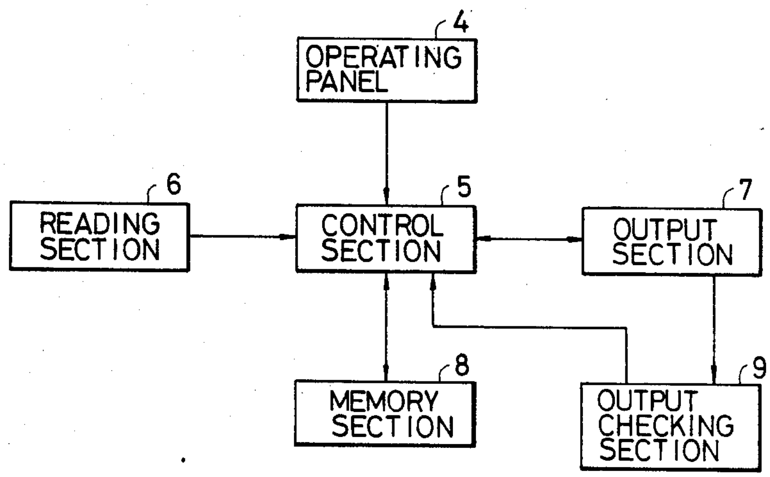
FIG. 3 is a block diagram of a document issuing apparatus according to the present invention.

FIG. 3 is a block diagram showing one embodiment of document issuing apparatus of the present invention. The document issuing apparatus comprises means for reading image data and form data from documents. As embodied herein, the reading means comprises a reading section 6 including a photoelectric conversion element and a mechanism including an illuminating device, a lens, and an electronic circuit. As is apparent to one skilled in the art, a document placed on a platen (not shown) is illuminated by the illuminating device and an image of the document is focused on the photoelectric conversion element by means of the lens. The electronic circuit is connected to the output of the photoelectric conversion element such that the visual image is transformed into corresponding electronic signals.

If the image on the document placed on the platen is one of the blank delivery slips 1a–1d shown in FIG. 1(*a*), then an electronic image of the particular form is generated. Similarly, if the document placed on the platen is the gift purchasing application or order document 2, then electronic signals representing the destination, gift identification, unit price, code, etc. are generated.

Memory means is provided for storing the image data (from the purchasing application) and the form data (delivery slips) read by the reading means. As embodied herein, the memory means comprises a memory section 8, e.g., an integrated circuit memory chip or a small disc drive, capable of storing the image data and form data in a retrievable manner.

Means are provided for editing the image data and the form data stored in the memory means to produce a series of slip images. As embodied herein, the editing means comprises an operating panel 4 and a control section 5. An operator enters slip processing information through the operating panel 4. The control section 5, which is advantageously embodied as a microprocessor, receives the control information and accesses the memory section 8 to selectively retrieve the stored image data and form data.

One with ordinary skill in the art would readily understand that the control section 5 operates under program control to select the appropriate form data and image data for combination such that a complete, electronic, slip image is generated. The control section 5 operates under such program control until electronic slip images of the delivery slips of FIGS. 2(*a*) through 2(*d*) are produced.

Means for printing the slip images on respective documents is also provided. As embodied herein, the printing means comprises an output section, i.e., an ink jet or other suitable printer, for forming visible reproductions of the electronic slip images. The output section also prints on the slip the digital markings identifying the type of each slip.

Means are also provided for examining the documents printed with the slip images to verify the order in which the documents have been printed. As embodied herein, the output checking system comprises an output check station 9 for checking the digital marks or code printed on the documents and for automatically indicating an uncoded or incorrectly coded document. One skilled in the art would readily understand that the output check section 9 includes a device for verifying the sequence of the printed slips in accordance with the digital marks or code. Such a device could be implemented by a photoelectric scanner and a simple sequence checker circuit.

In order to provide the set of written delivery slips as shown in FIG. 2(*a*) according to the gift purchasing written application 3 as shown in FIG. 1(*b*), the delivery slip blank form 1*a*, as shown in FIG. 1(*a*), is placed on the platen. Next, the operating panel is operated to provide a start instruction signal so that the reading section 6 reads the delivery slip blank form 1*a* by optical scanning to produce digital signals corresponding to the electronic image of the delivery form. The digital signals thus provided are stored in the memory section 8 under the control of the control section 5.

Similarly, the reading section 6 reads the delivery slip blank forms 1(*b*), 1(*c*), and 1(*d*), and the digital signals thereof are stored in the memory section 8. The images 1*a*', 1*b*', 1*c*', and 1*d*' of the four delivery slip blank forms thus stored are read out of the memory section 8 whenever a delivery slip is issued thereafter.

The gift purchasing application 2 is then placed on the platen and a delivery slip issuing start button (not shown) on the operating panel 4 is depressed. As in the case of inputting the data of the blank delivery slips 1, the gift purchasing application 2 is scanned and the output signals are stored in the memory section 8 as an electronic image of the gift purchasing application 2.

Next, the necessary image data of the image 2*a* of the gift purchasing application, including the data 2*b* representing a requesting person, are read out of the memory section 8 under the control of the control section 5. The positions of the data 2*a* and 2*b* are based on a coordinate system. Therefore, these data 2*a* and 2*b* can be readily identified and addressed by specifying their respective coordinates. The data 2*a* and 2*b* and the form data of the electronic images 1*a*', 1*b*', 1*c*', and 1*d*' of the blank delivery slips, which have been stored before, are then electronically combined and edited, and may be restored in the memory section 8. That is, slip image of one set of delivery slips (four kinds of delivery slips) are stored in the memory section 8. The slip images are then printed by the output section 7 and each printed slip image includes a digital mark or code identifying the type of slip image.

In the final step, the output checking section 9 checks the order of printed slips. As was described before, the slips 3*a*, 3*b*, 3*c*, and 3*d* have the digital marks representing the numerals "1", "2", "3", and "4", respectively, and are outputted in the stated order. The output checking section 9 has a sensor comprising, for instance, a light source and a photocell, which is arranged at a position through which the digital mark on each slip passes, in order to check whether or not the slips pass through the sensor in the stated order. This also permits a determination to be made as to whether or not other slips are improperly mixed in and whether or not the slips have passed through the sensor within a predetermined period of time. If not, the sensor operates to stop the apparatus and to allow the operator to take necessary measures to correct the problem.

As is apparent from the above description, according to the invention, the delivery slips thus produced are arranged in order and are prepared correctly and quickly. Accordingly, the number of steps required for after-management can be considerably reduced. In the above-described embodiment, the electronic forms are stored, and printed out. Therefore, preprinting is unnecessary, and it is also unnecessary to feed stock sheets in a particular order.

While the invention has been described with reference to the preferred embodiment, it should be noted that the invention is not limited thereto or thereby; that is, it may be modified as follows:

(1) In the above-described embodiment, the data of the delivery slip blank forms having the digital marks and the data of the gift purchasing application are read by the reading section and then are combined and edited. However, a method may be employed in which the blank forms of slips may have the digital marks printed in advance, and it is only required to print the image data in the output section 7.

(2) In the case where the output section 7 is followed by a cutter/stapler, it is preferable that the latter be provided with the output checking section 9.

(3) In the above-described embodiment, each delivery slip blank form has its mark at one position. However, provision of plural marks at plural positions of each delivery slip blank form could be used effectively.

(4) In the above-described embodiment, digital marks are used for indicating the order of the slips. Instead of the digital marks, numerals or characters may be printed so that the order of the slips can be detected by an OCR (optical character reader).

(5) In the above-described embodiment, the drafts are manually set on the platen. However, the drafts may be automatically supplied with an automatic draft forwarding device (ADF).

While the invention has been described with reference to the preparation of delivering slips, it goes without saying that the technical concept of the invention is applicable to slip or document preparing devices in which the slips or documents are to be checked as described above.

While the salient features of the invention have been described with reference to the drawings, it should be understood that the preferred embodiment described herein is susceptible of the above modifications and alterations, as well as others, without departing from the spirit and scope of the following claims.

What is claimed is:

1. An apparatus for issuing documents from a set of records containing form data identifying a type of form from which the set of records was constructed and also containing image data representing identifying information placed into corresponding portions of the forms, said apparatus comprising:

means for separately reading said image data and said form data from said records;

means for storing said image data and said form data read by said reading means;

means for combining and editing said stored image data and form data, as well as slip form identification data, to produce a series of slip images representing information to be printed as a series of slips;

means for reporducing each of said series of slip images as a visible image on a different one of a series of printed documents; and means for automatically examining said slip form identification data on said printed documents to determine whether the order in which said documents have been printed is correct.

2. A document issuing apparatus according to claim 1 wherein said form data on said records includes an identifying mark indicating the type of form containing said form data and said image data and wherein said reading means includes means for reading said identifying mark on each of said printed records.

3. A document issuing apparatus according to claim 2 wherein said combining and editing means comprises:

an operating panel for selecting an operation mode of the apparatus; and a control section coupled to said operating panel, said storing means, said reading means, and said reproducing means for transferring said image data and said form data to said storing means, for accessing said stored image data and form data in said storing means, and for transferring said slip images to said reproducing means.

4. A document issuing apparatus according to claim 3 wherein said reproducing means comprises a printer.

5. A document issuing apparatus for issuing a set of delivery documents on preprinted forms, each of said preprinted forms in a set containing slip form identification data, the apparatus comprising:

means for reading image data from an order form;

means for storing said image data read by said reading means;

means for editing said image data to produce a series of slip images, each one of said slip images corresponding to a different one of the preprinted forms in the set of delivery documents;

means for reproducing said slip images on the corresponding preprinted forms; and means for examining said slip form identification data on said forms and determining whether the preprinted forms with the reproduced slip images were reproduced in a selected sequence.

* * * * *